US012583506B2

(12) United States Patent
Hamrodi et al.

(10) Patent No.: US 12,583,506 B2
(45) Date of Patent: Mar. 24, 2026

(54) RACK GUIDE AND GEAR MECHANISM

(71) Applicant: OILES CORPORATION, Fujisawa (JP)

(72) Inventors: Robert Hamrodi, Butzbach (DE); Kai Metzler, Butzbach (DE)

(73) Assignee: Oiles Corporation, Kanagawa (JP)

( * ) Notice: Subject to any disclaimer, the term of this patent is extended or adjusted under 35 U.S.C. 154(b) by 27 days.

(21) Appl. No.: 18/844,315

(22) PCT Filed: Mar. 9, 2023

(86) PCT No.: PCT/JP2023/009178
§ 371 (c)(1),
(2) Date: Sep. 5, 2024

(87) PCT Pub. No.: WO2023/189390
PCT Pub. Date: Oct. 5, 2023

(65) Prior Publication Data
US 2025/0196910 A1 Jun. 19, 2025

(30) Foreign Application Priority Data
Mar. 29, 2022 (JP) ................................. 2022-054327

(51) Int. Cl.
B62D 3/12 (2006.01)
(52) U.S. Cl.
CPC .................................... B62D 3/126 (2013.01)
(58) Field of Classification Search
CPC ................................. B62D 3/12; B62D 3/126
(Continued)

(56) References Cited

U.S. PATENT DOCUMENTS 11,198,466 B2 * 12/2021 Feldpausch ............ B62D 3/123
11,254,347 B2 * 2/2022 Ikeyama ................ F16C 27/06
(Continued)

FOREIGN PATENT DOCUMENTS

JP    H09104350 A    4/1997
JP    2002178935 A    6/2002
(Continued)

OTHER PUBLICATIONS

Otsuka Hiroyuki English Translation and original document (Year: 1995).*

(Continued)

*Primary Examiner* — Paul N Dickson
*Assistant Examiner* — Caitlin Anne Miller
(74) *Attorney, Agent, or Firm* — Nixon & Vanderhye P.C.

(57) ABSTRACT

Provided are a rack guide that can stably support a rack bar and avoid rattling noise occurrence, and a gear system using the same.
A rack guide (30) have the following: a rack guide body (31) made of synthetic resin, which has a cylindrical shape with a front end face and has a guide surface (310) formed in the front end face so as to slide on a back (22) of a rack bar (20); supporting portions (32a, 32b) made of synthetic resin, which each protrude beyond an outer circumferential surface (311) of the rack guide body (31) and are movable in a radial direction of the rack guide body (31); and a biasing portions (33a, 33b) provided for each supporting portion (32a, 32b) and made of synthetic resin, which extends circumferentially from both sides (in a circumferential direction of the rack guide body (31)) of the corresponding supporting portion (32a, 32b) and connects to the rack guide body (31) so as to bias the corresponding supporting portion (32a, 32b) outwardly in the radial direction of the rack guide body (31).

14 Claims, 8 Drawing Sheets

(A)

(B)

(58) Field of Classification Search
 USPC ...................................... 180/428; 280/93.514
 See application file for complete search history.

(56) References Cited

U.S. PATENT DOCUMENTS

| | | | | |
|---|---|---|---|---|
| 2018/0257696 | A1* | 9/2018 | Ikeda | ................... F16H 55/283 |
| 2019/0135329 | A1 | 5/2019 | Feldpausch et al. | |
| 2020/0089337 | A1* | 3/2020 | Togashi | .............. G02F 1/13338 |

FOREIGN PATENT DOCUMENTS

| | | | |
|---|---|---|---|
| JP | 2009-113732 | A | 5/2009 |
| JP | 5025212 | B2 | 9/2012 |
| JP | 2013-508638 | A | 3/2013 |
| JP | 2018-144701 | A | 9/2018 |
| JP | 2021-79886 | A | 5/2021 |

OTHER PUBLICATIONS

International Search Report for PCT/JP2023/009178, mailed May 23, 2023, 5 pages.
Written Opinion of the ISA for PCT/JP2023/009178, mailed May 23, 2023, 4 pages.
Office Action dated Sep. 30, 2025 issued in Japanese Application No. 2022-054327 with machine English translation (10 pages).

* cited by examiner (B)

(A)

RACK GUIDE AND GEAR MECHANISM

CROSS-REFERENCE TO RELATED APPLICATIONS

This application is the U.S. national phase of International Application No. PCT/JP2023/009178 filed Mar. 9, 2023 which designated the U.S. and claims priority to JP 2022-054327 filed Mar. 29, 2022, the entire contents of each of which are hereby incorporated by reference.

TECHNICAL FIELD

The present invention relates to a rack guide (a support yoke) that supports a rack bar while pressing it against a pinion and guides the rack bar in an axial direction thereof, in a rack and pinion intended for use in a steering device for an automobile and the like, and to a gear system using the same.

BACKGROUND ART

A known rack guide disclosed in Patent Literature 1, is located behind a back (a surface on the opposite side to the rack gear) of a rack bar put in a housing, in a rack and pinion intended for use in a steering device for an automobile and the like to support the rack bar while pressing it against a pinion and to guide the rack bar in an axial direction thereof. This rack guide is movably installed in the housing and biased in an axial direction of thereof by a spring, and supports the rack bar while sliding with the back of the rack bar. An outer circumferential surface of the rack guide includes narrow slits that are extending the axial direction and arranged at plural equally spaced locations, and a stick-shaped solid lubricant is embedded in each of the slits and exposed from the outer circumferential surface of the rack guide to allow sliding with an inner circumferential surface of the housing. These solid lubricants enable the rack guide to be fitted in the housing without an unintended clearance, thus contributing to avoiding any rattling noise, which would otherwise be caused by rattling of the rack guide within the housing.

CITATION LIST

Patent Literature

[Patent Literature 1] Japanese Unexamined Patent Application Laid-Open No. 2002-178935

SUMMARY OF INVENTION

Technical Problem

However, the rack guide disclosed in Patent Literature 1 has such a structure that one of the stick-shaped solids lubricant is embedded in each of the slits defined in the outer circumferential surface of the rack guide, which leads to an increase in the number of components and the required man-hours, resulting in higher costs.

The present invention has been made in view of the above situation, and an object of the invention is to provide a rack guide having lower manufacturing costs, which can stably support a rack bar and avoid rattling noise occurrence, and a gear system using the same.

Solution to Problem

In response to the above issue, the present invention provides a rack guide made of synthetic resin, and the rack guide having the following: a rack guide body having a cylindrical shape with an end face, the end face including a guide surface configured to slide with a back of a rack bars; a plurality of supporting portions each protruding beyond an outer circumferential surface of the rack guide body and being movable in a radial direction of the rack guide body; and a biasing portion provided for each of the supporting portions and made of synthetic resin, the biasing portion extending along a circumferential direction of the rack guide body from both sides (in the circumferential direction) of a corresponding one of the supporting portions and connecting to the rack guide body to have potential to bias the corresponding one of the supporting portions outwardly in the radial direction. Here, the outer circumferential surface of the rack guide body may have a pocket for holding the supporting portions together with the biasing portion.

For example, a rack guide according to the present invention is that configured to support a rack bar having a rack gear in mesh with a pinion gear from an opposite side to the rack gear while allowing the rack bar to slide, and to guide the rack bar the rack bar moving in response to rotation of the pinion gear in an axial direction of the rack bar; and has the following:

a rack guide body made of synthetic resin, the rack guide body having a cylindrical shape having an end face, the end face including a guide surface to slide with a back of the rack bar;

a plurality of supporting portions made of synthetic resin, the supporting portions each protruding beyond an outer circumferential surface of the rack guide body to be movable in a radial direction of the rack guide body; and a biasing portion provided for each of the supporting portions and made of synthetic resin, the biasing portion extending along a circumferential direction of the rack guide body from both sides of a corresponding one of the supporting portions in the circumferential direction and connecting to the rack guide body to configured to bias the corresponding one of the supporting portions outwardly in the radial direction of the rack guide body.

Advantageous Effects of Invention

According to the present invention, the biasing portions bias the respective supporting portions outwardly in the radial direction of the rack guide body, thereby causing the supporting portions to support the rack guide while pressing against and sliding with an inner wall of a housing; this causes the rack guide to be fitted in the housing without any unintended clearance, resulting in avoidance of any rattling noise occurrence. Moreover, the rack guide body, the supporting portions, and the biasing portions are all made of synthetic resin, and each biasing portion extends from the both sides (in the circumferential direction of the rack guide body) of the corresponding supporting portion in the circumferential direction and connects to the rack guide body; such a structure can be integrally molded of the same resin material, thus leading to fewer components and man-hours. Therefore, according to the present invention, lower manufacturing costs, stability of the supported rack bar, and avoidance of any rattling noise occurrence are successfully provided.

DESCRIPTION OF EMBODIMENTS

In the following, one embodiment of the present invention will be described with reference to the drawings.

It should be understood that three directions are defined just for convenience of the description below and used in the each drawing where appropriate: a direction of an axis O2 of a rack bar 20 (a direction in which the rack bar 20 it to reciprocate) as an X direction; a direction in which a rack gear 21 is to pressed against a pinion gear 11 as a Z direction; and a direction perpendicular to the X and Z directions as a Y direction.

Figure 1:
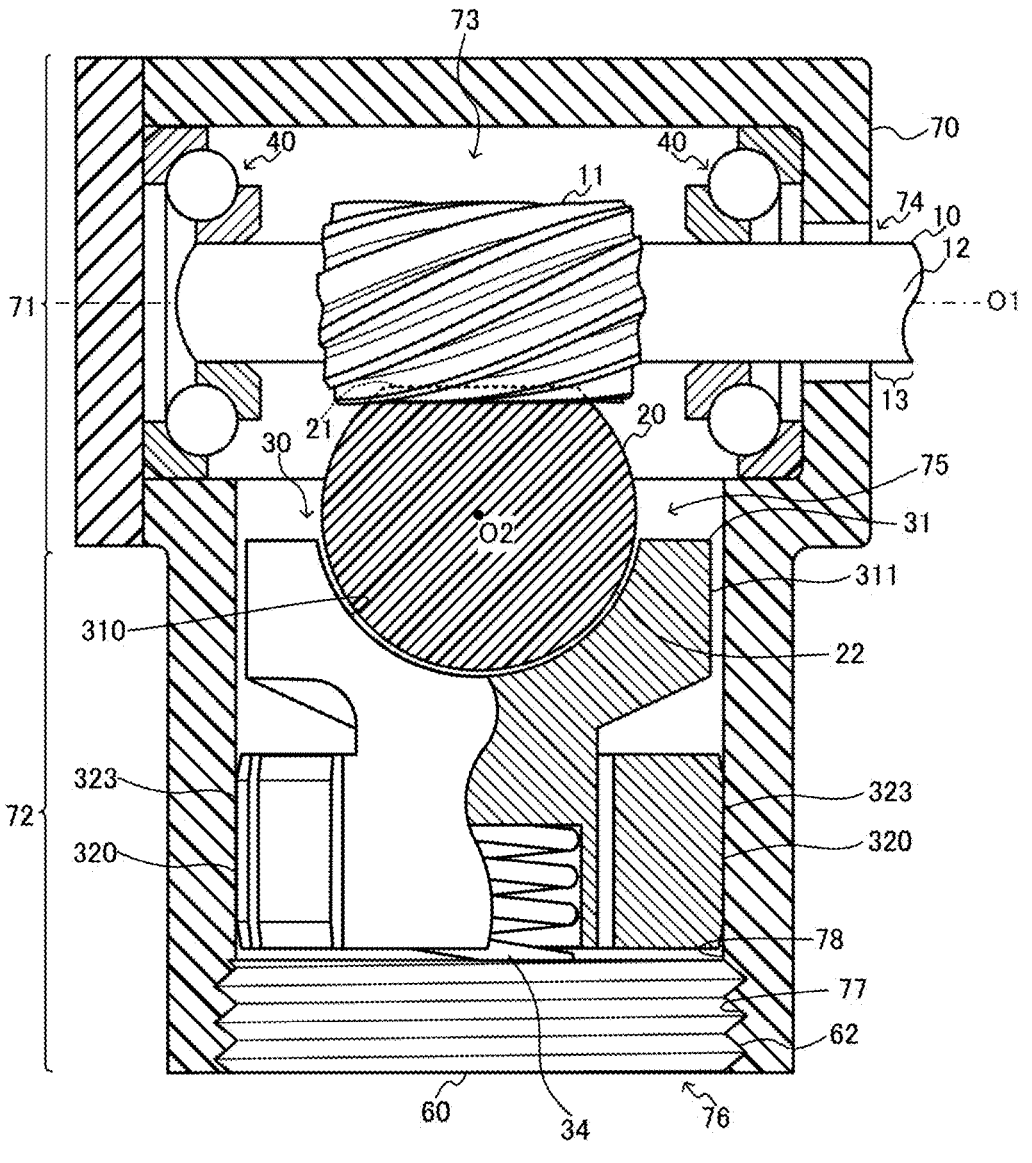
FIG. 1 is a schematic cross-sectional view of a gear system 1 for a steering device according to one embodiment of the present invention.

FIG. 1 is a schematic cross-sectional view of a gear system 1 for a steering device according to the present embodiment.

The steering device according to the present embodiment has the rack and pinion gear system 1 which transforms rotary motion of a steering shaft into linear motion and transmits this linear motion to linkages which each change a direction of a corresponding wheel. It should be understood that the steering device may or may not be provided with a power steering system that uses a motor to assist the movement of the pinion gear 11 or of the rack bar 20.

As illustrated in the drawings, this gear system 1 has the following: a pinion shaft 10 having the pinion gear 11 formed thereon; the rack bar 20 having the rack gear 21 formed thereon to mesh with the pinion gear 11; a pair of rolling bearings 40 supporting the pinion shaft 10 while allowing the pinion shaft 10 to rotate; a rack guide 30 configured to guide the rack bar 20 so as to allow it to reciprocate in the X direction as the pinion gear 11 rotates; a housing 70 containing these components 10 to 40; and a cap 60 closing the housing 70.

The pinion shaft 10, which is a cylindrical members arranged with an axis O1 thereof inclined toward the X direction with respect to the Y direction, has an outer circumferential surface on which the pinion gear 11, such as a helical gear, is defined. The pinion gear 11 is placed in a pinion gear compartment 73 defined within the housing 70, and the pinion shaft 10 is rotatably supported around the axis O1 by the housing 70 via a pair of the rolling bearings 40 at positions on both sides of the pinion gear 11. One end portion 13 of the pinion shaft 10 projects out of the pinion gear compartment 73 through an opening 74 defined in the housing 70 and is coupled with the steering shaft not illustrated. This allows the pinion gear 11 to rotate in conjunction with the steering shaft rotating in response to an operation of a steering wheel.

The rack bar 20 is a cylindrical member arranged along the X direction, both end of which are, not illustrated, connected via respective ball joints to the respective linkages that each change the direction of the corresponding wheel. Teeth included in the rack gear 21 are arranged in a row in the X direction in an outer circumferential surface of the rack bar 20, and come into mesh with the teeth of the pinion gear 11 at a predetermined mesh position in the pinion gear compartment 73 of the housing 70. Depending on a magnitude of a load applied to the rack bar 20, the rack bar 20 can be slidably supported by the rack guide 30 on its back (an outer circumferential surface which is located on the opposite side to the rack gear 21 and which is arcuate in YZ cross-section) 22. Responsive to rotation of the pinion shaft 10 with the steering shaft, the mesh between the pinion gear 11 and the rack gear 21 causes the rack bar 20 to reciprocate in the X direction while being guided by the rack guide 30, thereby swinging the linkages. This generates changes of the direction of the wheel in response to the operations of the steering wheel.

The housing 70 includes a rack casing portion 71 in a hollow cylindrical shape, arranged along the X direction; and a cylinder casing portion 72 in a hollow cylindrical shape, projecting in the Z direction from the outer periphery of the rack casing portion 71.

The rack casing portion 71 contains the rack bar 20 in such a manner that the rack bar 20 is allowed to reciprocate in the X direction. The pinion gear compartment 73 is defined in this rack casing portion 71. As described above, this pinion gear compartment 73 contains the pinion gear 11 and a pair of the rolling bearings 40, and the pinion shaft 10 is rotatably supported by the rolling bearings 40 in such a manner that the pinion gear 11 meshes with the rack gear 21 at the predetermined mesh position. The rack casing portion 71 includes an opening 74 connecting the inside and outside of the pinion gear compartment 73 to each other and facing the steering shaft not illustrated, and one end portion 13 of the pinion shaft 10, which is coupled to the steering shaft not illustrated, projects through this opening 74 toward the outside of the pinion gear compartment 73.

One the other hand, the cylinder casing portion 72 is integrally formed with the rack casing portion 71 so as to be located on the opposite side of the rack bar 20 from the pinion gear 11, and an inside of the cylinder casing portion 72 and an inside of the rack casing portion 71 are connected to each other via an opening 75 facing the pinion gear 11 in the pinion gear compartment 73. An inner wall surface 78 of the cylinder casing portion 72 includes a threaded portion 77 for securing a cap 60, at an open end 76.

The rack guide 30, which has a guide surface 310 for supporting the back 22 of the rack bar 20 while allowing it to slide, is arranged in the cylinder casing portion 72 in the Z direction with the guide surface 310 facing the back 22 of the rack bar 20, and is located on the opposite side of the rack bar 20 from the pinion gear 11 (behind the back 22 of the rack bar 20 in the mesh position between the pinion gear 11 and the rack gear 21). A detailed structure of the rack guide 30 will be described below.

The cap 60 has a disc shape attachable to the open end 76 of the cylinder casing portion 72, and a threaded portion 62 is formed in an outer periphery of the cap 60. Inserting the rack guide 30 into the cylinder casing portion 72 of the housing 70 and then screwing the threaded portion 62 of the cap 60 onto the threaded portion 77 on the open end 76 of the cylinder casing portion 72 causes the cap 60 to be secured to the open end 76 of the cylinder casing portion 72 and close the cylinder casing portion 72.

A structure of the rack guide 30 is described in detail below.

FIG. 2(A) and FIG. 2(B) are a front view and a side view, respectively, of the rack guide 30 illustrated in FIG. 1; and FIG. 3(A) and FIG. 3(B) are a plane view and a bottom view, respectively, of the rack guide 30 illustrated in FIG. 1. Additionally, FIG. 4(A) and FIG. 4(B) are an A-A cross-sectional view and a B-B cross-sectional view, respectively, of the rack guide 30 illustrated in FIG. 3(A).

As illustrated in the drawings, the rack guide 30 has a rack guide body 31 in a cylindrical shape; a pair of supporting portions 32*a*, 32*b* arranged to be movable in a radial direction of the rack guide body 31; biasing portions 33*a*, 33*b* designed to bias the supporting portions 32*a*, 32*b* outwardly in the radial direction of the rack guide body 31, respectively; and a spring 34.

The rack guide body 31 has the guide surface 310 defined in a concave manner in a front end face (one end face on the side closer to the rack bar 20) of the rack guide body 31 so as to slide with the back of the rack bar 20; a pair of pockets 312*a*, 312*b* each provided in an outer circumferential surface 311 of the rack guide body 31 to hold the corresponding supporting portion 32*a*, 32*b* along with the corresponding biasing portion 33*a*, 33*b*; and a spring guide 313 designed to contain the spring 34.

Areas 314 within the guide surface 310, which tend to slide with the back of the rack bar 20, include a large number of depressions each acting as a grease reservoir 315.

The pockets 312*a*, 312*b* are formed on both sides (in a direction (the Y direction) perpendicular to both a direction (the X direction) of sliding between the guide surface 310 and the rack bar 20 and a direction (the Z direction) of an axis O3 of the rack guide 30) of the outer circumferential surface 311 of the rack guide body 31 as if the outer circumferential surface 311 were partially cut off. The pocket 312*a* contains the supporting portion 32*a* with the biasing portion 33*a*, and the pocket 312*b* contains the supporting portion 32*b* with the biasing portion 33*b*.

The spring guide 313 is a cylindrical hole open in a rear end face (another end face on the side closer to the cap 60), and the spring 34 is placed in this spring guide.

The supporting portions 32*a*, 32*b* are arranged on both sides (in the direction (the Y direction) perpendicular to both the direction (the X direction) of sliding between the guide surface 310 and the rack bar and the direction (the Z direction) of the axis O3 of the rack guide 3) of the rack guide body 31 (see FIG. 3(B)), and are placed in the pockets 312*a*, 312*b* along with the biasing portions 33*a*, 33*b*, respectively. Each of the supporting portions 32*a*, 32*b* has a primary protrusion 320 and a pair of secondary protrusions 321*a*, 321*b* that are located on both sides (in a circumferential direction of the rack guide body 31) of the primary protrusion 320.

The primary protrusion 320 has a supporting surface 323 protruding beyond the outer circumferential surface 311 of the rack guide body 31, and this supporting surface 323 is to slide over the inner wall surface 78 of the cylinder casing portion 72 of the housing 70 in the direction (the Z direction) of the axis O3 of the rack guide body 31. This allows the rack guide 30 to be fitted in the cylinder casing portion 72 without any unintended clearance and to slide in the direction of the axis O3 of the rack guide body 31.

The secondary protrusions 321*a*, 321*b* each have a supporting surface 324 that protrudes beyond the outer circumferential surface 311 of the rack guide body 31 but is located more radially inward than the supporting surface 323 of the primary protrusion 320. If any radial load is applied to the primary protrusion 320 sliding over the inner wall surface 78 of the cylinder casing portion 72 of the housing 70 and thereby causes the primary protrusion 320 to move radially inwardly, then the supporting surfaces 324 of the adjacent secondary protrusions 321*a*, 321*b* can become in contact with the inner wall surface 78 of the cylinder casing portion 72 of the housing 70 to support the radial load along with the primary protrusion 320.

The biasing portion 33*a* is a member in the form of flat spring extending along the circumferential direction of the rack guide body 31 from the both sides (in the circumferential direction) of the supporting portion 32*a* to connect to the rack guide body 31, and the biasing portion 33*b* is a member in the form of flat spring extending circumferentially from the both sides (in the circumferential direction of the rack guide body 31) of the supporting portion 32*b* to connect to the rack guide body 31. Each of the biasing portions 33*a*, 33*b* includes first flat spring portions 330*a*, 330*b*, a second flat spring portion 331*a*, and a second flat spring portion 331*b*: for each biasing portion 33*a*, 33*b*, the first flat spring portions 330*a*, 330*b* extend circumferentially from the corresponding primary protrusion 320 to connect to the corresponding secondary protrusions 321*a*, 321*b*, respectively, the second flat spring portion 331*a* extends circumferentially and radially from the corresponding secondary protrusion 321*a* toward an edge 317*a* on the radially outer side of one side wall 316*a* in the corresponding pocket 312*a*, 312*b* to connect to the rack guide body 31, and the second flat spring portion 331*b* extends circumferentially and radially form the corresponding secondary protrusion 321*b* toward an edge 317*b* on the radially outer side of another side wall 316*b* in the corresponding pocket 312*a*, 312*b* to connect to the rack guide body 31.

The rack guide body 31, the supporting portions 32*a*, 32*b* (respective primary protrusions 320 and respective secondary protrusions 321*a*, 321*b*), and the biasing portions 33*a*, 33*b* (respective first flat spring portions 330*a*, 330*b* and respective second flat spring portions 331*a*, 331*b*) are all integrally molded into one piece using synthetic resin material, such as polyethylene terephthalate fiber-reinforced with glass, etc., polybutylene terephthalate, polyamide, polyphenylene sulfide, and polyacetal.

The spring 34 is, but not limited to, a coil spring or a flat spring, and is placed in the spring guide 313 of the rack guide body 31. The spring 34 has a longer free length than the height (depth) of the spring guide 313, and one end portion of the spring 34 projects out of an opening of the spring guide 313 to have a contact with the cap 60. Therefore, the cap 60 can act as a bearing surface for the spring 34, and the spring 34 can bias the rack guide body 31 in a direction to push it toward the rack bar 20 in such a manner that the guide surface 310 contacts with and is pressed against the back 22 of the rack bar 20. This causes the rack gear 21 to be pressed against the pinion gear 11, thereby preventing the opposite teeth in the mesh position between the rack gear 21 and the pinion gear 11 from separating.

Figure 5:
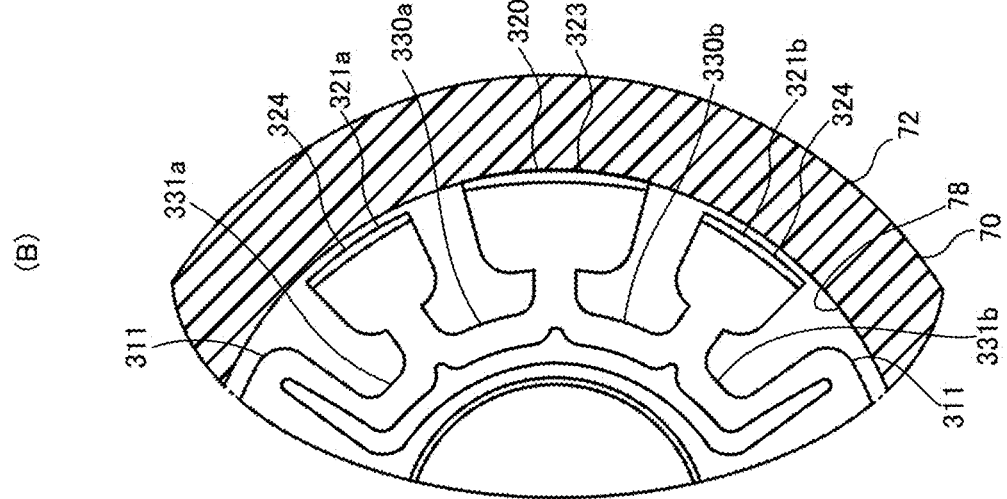
FIG. 5(A) is a view of the rack guide 30 placed in a cylinder casing portion 72 of a housing 70, as seen from the bottom side of the gear system 1.
FIG. 5(B) is an enlarged view of the part C in FIG. 5(A).
Figure 5:
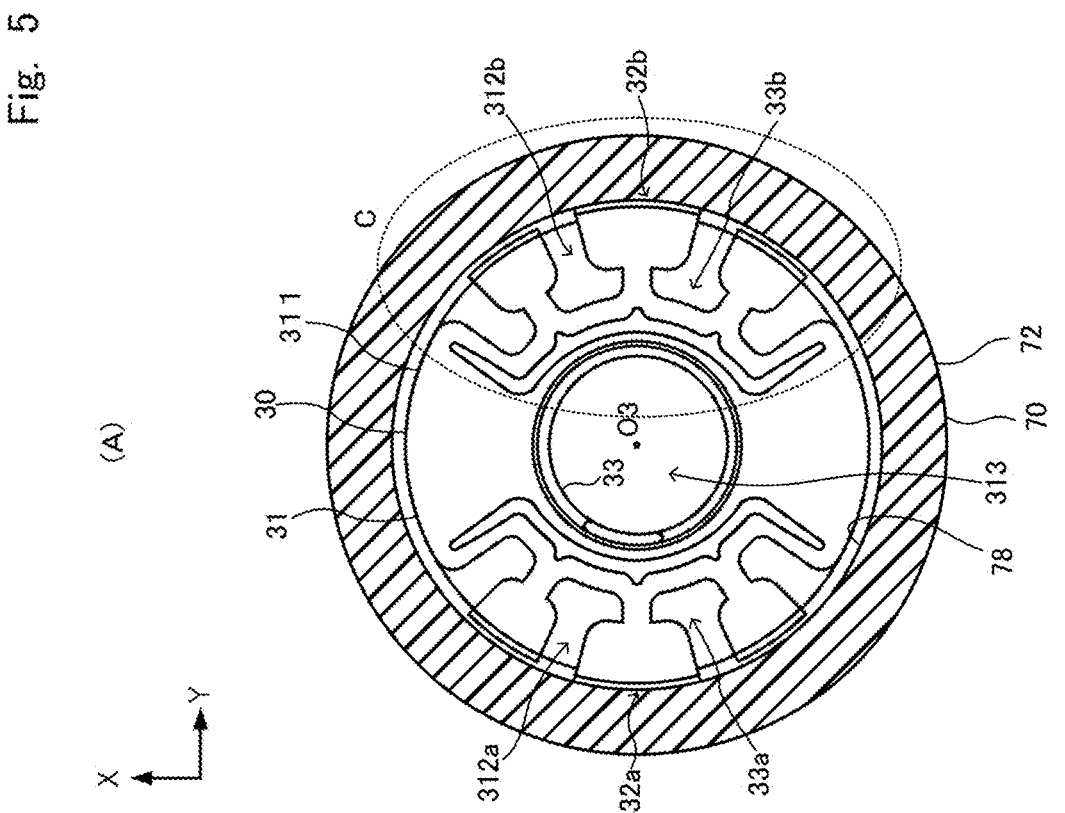

FIG. 5(A) is a view of the rack guide 30 placed in the cylinder casing portion 72 of the housing 70, as seen from the bottom side of the gear system 1, and FIG. 5(B) is an enlarged view of the part C in FIG. 5(A).

As illustrated in FIG. 5(A) and FIG. 5(B), the supporting portions 32*a*, 32*b* are each under an outward force in the radial direction of the rack guide body 31 from the first flat spring portions 330*a*, 330*b* of the respective biasing portions 33*a*, 33*b*, and have their respective supporting surfaces 323 projected beyond the outer circumferential surface 311 of the rack guide body 31 and slidable over the inner wall surface 78 of the cylinder casing portion 72 of the housing 70. This enables the rack guide 30 in the cylinder casing portion 72 to be placed, without any unintended clearance, movably in the direction of the axis O3.

Moreover, the secondary protrusions 321a, 321b are each under an outward force in the radial direction of the rack guide body 31 from the corresponding one of the first flat spring portions 330a, 330b of the corresponding biasing portion 33a, 33b and the corresponding second flat spring portion 331a, 331b, and have their respective supporting surfaces 324 projected beyond the outer circumferential surface 311 of the rack guide body 31 but positioned more radially-inwardly than the supporting surface 323 of the primary protrusion 320; under this situation, if a large radial load acts on the rack guide 30 and thereby causes any one of the primary protrusions 320 to move inwardly in the radial direction, then the supporting surfaces 324 of the corresponding secondary protrusions 321a, 321b each come into contact with the inner wall surface 78 of the cylinder casing portion 72 of the housing 70 to support the radial load along with the primary protrusion 320.

Hereinabove, one embodiment of the present invention has been described.

According to the present embodiment, the supporting portions 32a, 32b are based outwardly in the radial direction of the rack guide body 31 by the respective biasing portions 33a, 33b and thus pressed against the inner wall surface 78 of the cylinder casing portion 72 of the housing 70 while being allowed to slide thereon, thereby supporting the rack guide 30. This allows the rack guide 30 to be fitted in the housing 70 without any unintended clearance, resulting in avoidance of rattling noise occurrence. In addition, the rack guide body 31, the supporting portions 32a, 32b, and the biasing portions 33a, 33b are all made of synthetic resin, and the biasing portions 33a, 33b extend circumferentially from the both sides (in the circumferential direction of the rack guide body 31) of the respective supporting portions 32a, 32b to connect to the rack guide body 31; this structure allows these portions to be integrally molded in a single piece using the same resin material, thereby leading to fewer components and reduced man-hours. Therefore, the present embodiment enables lower-cost manufacturing and successfully provides stability of the supported rack bar 20 while avoiding any rattling noise occurrence.

In the present embodiment, each of the supporting portions 32a, 32b has the primary protrusion 320 and a pair of the secondary protrusions 321a, 321b located on both sides (in the circumferential direction of the rack guide body 31) of the primary protrusion 320, the primary protrusion 320 has the supporting surface 323 protruding beyond the outer circumferential surface 311 of the rack guide body 31, and the secondary protrusions 321a, 321b each have the supporting surface 324 protruding beyond the outer circumferential surface 311 of the rack guide body 31 but located more radially-inwardly than the supporting surface 323 of the primary protrusion 320. Consequently, the supporting surface 323 of the primary protrusion 320 protrudes beyond the outer circumferential surface 311 of the rack guide body 31 to allow it to slide over the inner wall surface 78 of the cylinder casing portion 72 of the housing 70 and thereby supports the rack guide 30; if a large load acts on the rack guide 30 in the radial direction thereby moving the primary protrusion 320 inwardly in the radial direction, then the supporting surfaces 324 of the secondary protrusions 321a, 321b each come into contact with the inner wall surface 78 of the cylinder casing portion 72 of the housing 70 to support the radial load along with the primary protrusion 320. Therefore, according to the present embodiment, even when the large load acts on the rack guide 30 in the radial direction, the rack bar 20 is stably supported while any rattling noise is provided from occurring.

In the present embodiment, the biasing portions 33a, 33b each have the first flat spring portions 330a, 330b and the second flat spring portions 331a, 331b, the first flat spring portions 330a, 330b extend circumferentially from the both sides (in the circumferential direction of the rack guide body 31) of the primary protrusion 320 to connect to the secondary protrusions 321a, 321b, and the second flat spring portions 331a, 331b extend circumferentially and radially from the secondary protrusions 321a, 321b toward the edges 317a, 317b on the radially outer sides of the side walls 316a, 316b in the pocket 312a, 312b to connect the rack guide body 31. This allows each of the primary protrusions 320 and the corresponding secondary protrusions 321a, 321b to move in the radial directions independently of each other, and allows the primary protrusions 320 to move in the radial direction in response to an application of a large load to the rack guide 30 in the radial direction, thereby causing the biasing portions 33a, 33b to absorb the radial load. Therefore, according to the present embodiment, the potential occurrence of any rattling noise is more effectively avoided even if a larger load is applied to the rack guide 30 in the radial direction.

In the present embodiment, the rack guide body 31 has the pockets 312a, 312b defined in the outer circumferential surface 311 of the rack guide body 31 and each containing the supporting portion 32a, 32b along with the corresponding biasing portions 33a, 33b. This prevents the provision of the supporting portions 32a, 32b and the biasing portions 33a, 33b from leading to an increase in size of the rack guide 30.

In the present embodiment, the supporting portions 32a, 32b are arranged on both side of the rack guide body 31 in the direction (the Y direction) perpendicular to the direction of sliding between the guide surface 310 and the rack bar 20 (the X direction). Therefore, according to the present embodiment, the supporting portions 32a, 32b can support a possible load acting on the rack bar 20 in the direction (the Y direction) perpendicular to both of the direction of sliding between the guide surface 310 and the rack bar 20 (the X direction) and the direction (the Z direction) of the axis O3 of the rack guide 30 during time when rotary motion of the pinion shaft 10 is transformed into linear motion of the rack bar 20 in a direction (the X direction) of the axis O2, thus more effectively preventing the rack guide 30 from rattling in the cylinder casing portion 72.

The present invention can include, but is not limited to, the above embodiment: it will be obvious to those skilled in the art that various changes may be made without departing from the scope and sprit of the invention.

For example, the above embodiment provides, but is not limited to, two supporting portions 32a, 32b along with the respective biasing portions 33a, 33b. Three or more supports may be provided along with the respective biasing portions. In such a case, at least one of the supporting portions is preferably arranged on the rack guide body 31 in the direction (the Y direction) perpendicular to the direction of sliding between the guide surface 310 and the rack bar 20 (the X direction).

In the above embodiment, each of the supporting portions 32a, 32b has the primary protrusion 320 and a pair of the secondary protrusions 321a, 321b located on both sides of the primary protrusion 320 in the circumferential direction of the rack guide body 31, the primary protrusion 320 has the supporting surface 323 that protrudes beyond the outer circumferential surface 311 of the rack guide body 31, and the secondary protrusions 321a, 321b have the respective supporting surfaces 324 that protrude beyond the outer circumferential surface 311 of the rack guide body 31 but are located more radially inward than the supporting surface 323 of the primary protrusion 320. However, the present invention is however not limited to this aspect. The secondary protrusions 321a, 321b each have a lower stiffness than that of the corresponding primary protrusion 320 is, and thus may be of any type as long as, during when a large load is applied to the rack guide 30 in the radial direction, it can reinforce the corresponding primary protrusion 320 and support the load along with the corresponding primary protrusion 320. An adjustability for the stiffness of each primary protrusion 320 and for that of each secondary protrusion 321a, 321b is provided, for example, by changing an elastic force of each first flat spring portion 330a, 330b and that of each second flat spring portion 331a, 331b, specifically, by changing at least one of the following dimensions of each first flat spring portion 330a, 330b and at least one of the following dimensions of each second flat spring portion 331a, 331b: length, width, thickness, and size of a round portion.

In the above embodiment, each of the supporting portions 32a, 32b includes the primary protrusion 320 and a pair of the secondary protrusions 321a, 321b located on both sides of the primary protrusion 320 in the circumferential direction of the rack guide body 31; however, the present invention is not limited to this aspect. One or both of the secondary protrusions 321a, 321b may be omitted.

In the above embodiment, in addition to the supporting portions 32a, 32b, another supporting portion slidable with the inner wall surface 78 of the cylinder casing portion 72 of the housing 70 may also be provided on both sides (in the direction (the X direction) of sliding between the guide surface 310 and the rack bar 20) of the outer circumferential surface 311 of the rack guide body 31 so as to be movable in the radial direction of the rack guide body 31.

FIG. 6(A) and FIG. 6(B) are a front view and a side view, respectively, of a modification 30A of the rack guide 30; and FIG. 7(A) and FIG. 7(B) are a plane view and a bottom view, respectively, of the modification 30A of the rack guide 30. Additionally, FIG. 8(A) and FIG. 8(B) are a D-D cross-sectional view and an E-E cross-sectional view, respectively, of the modification 30A of the rack guide 30 illustrated in FIG. 7(A).

Figure 2:
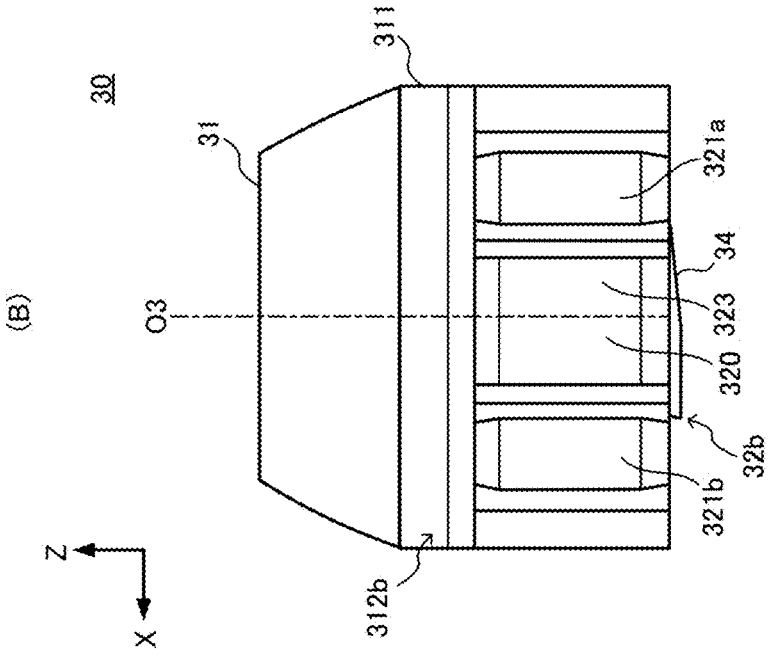
FIG. 2(A) and FIG. 2(B) are a front view and a side view, respectively, of a rack guide 30 illustrated in FIG. 1.
Figure 2:
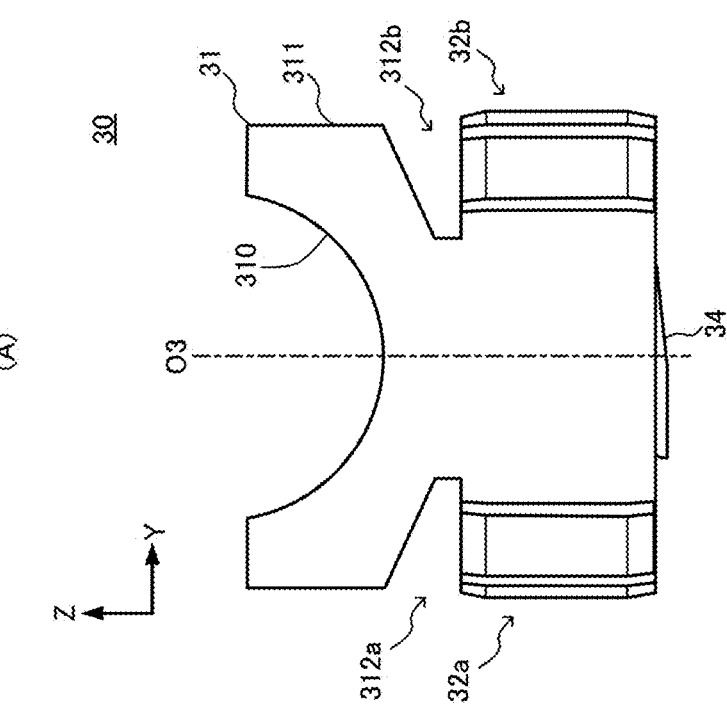
Figure 3:
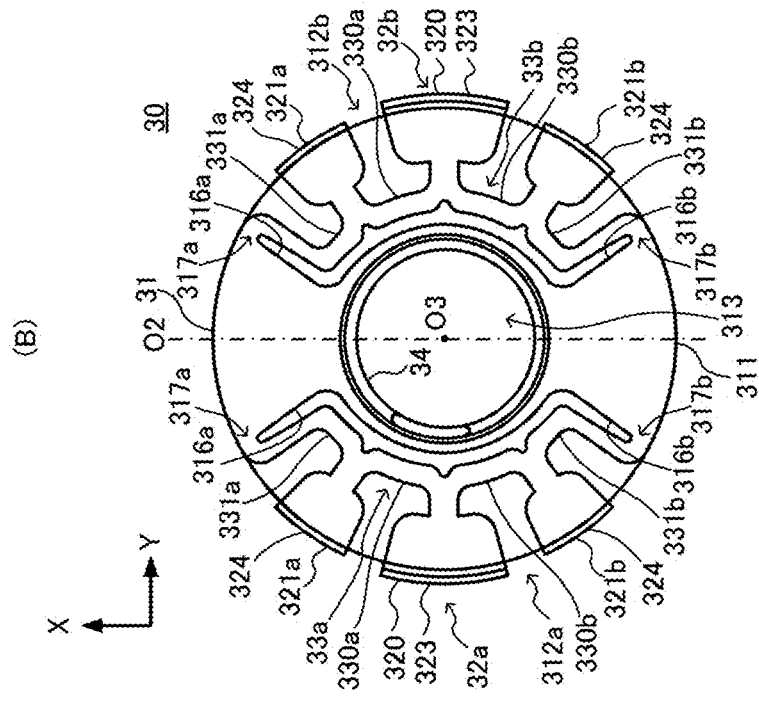
FIG. 3(A) and FIG. 3(B) are a plane view and a bottom view, respectively, of the rack guide 30 illustrated in FIG. 1.
Figure 3:
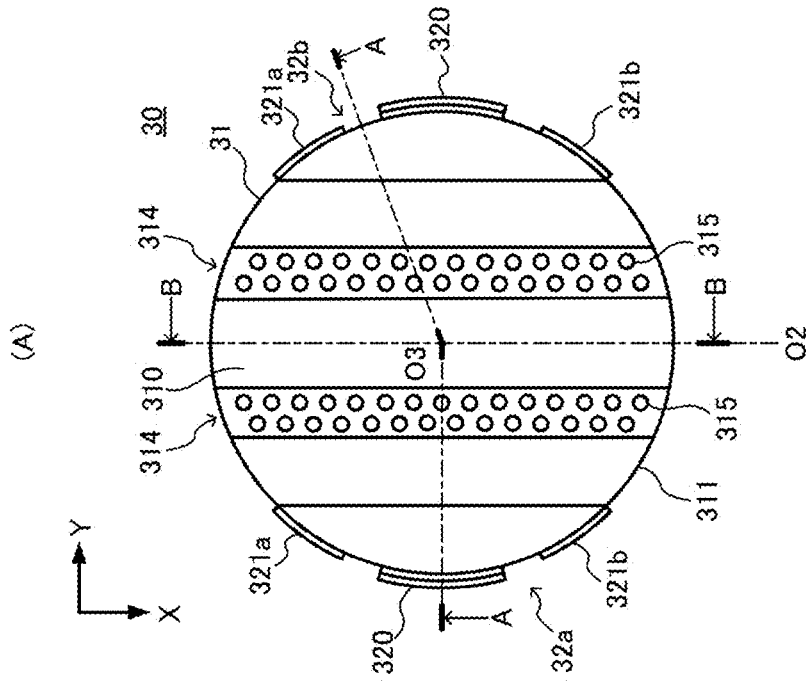
Figure 4:
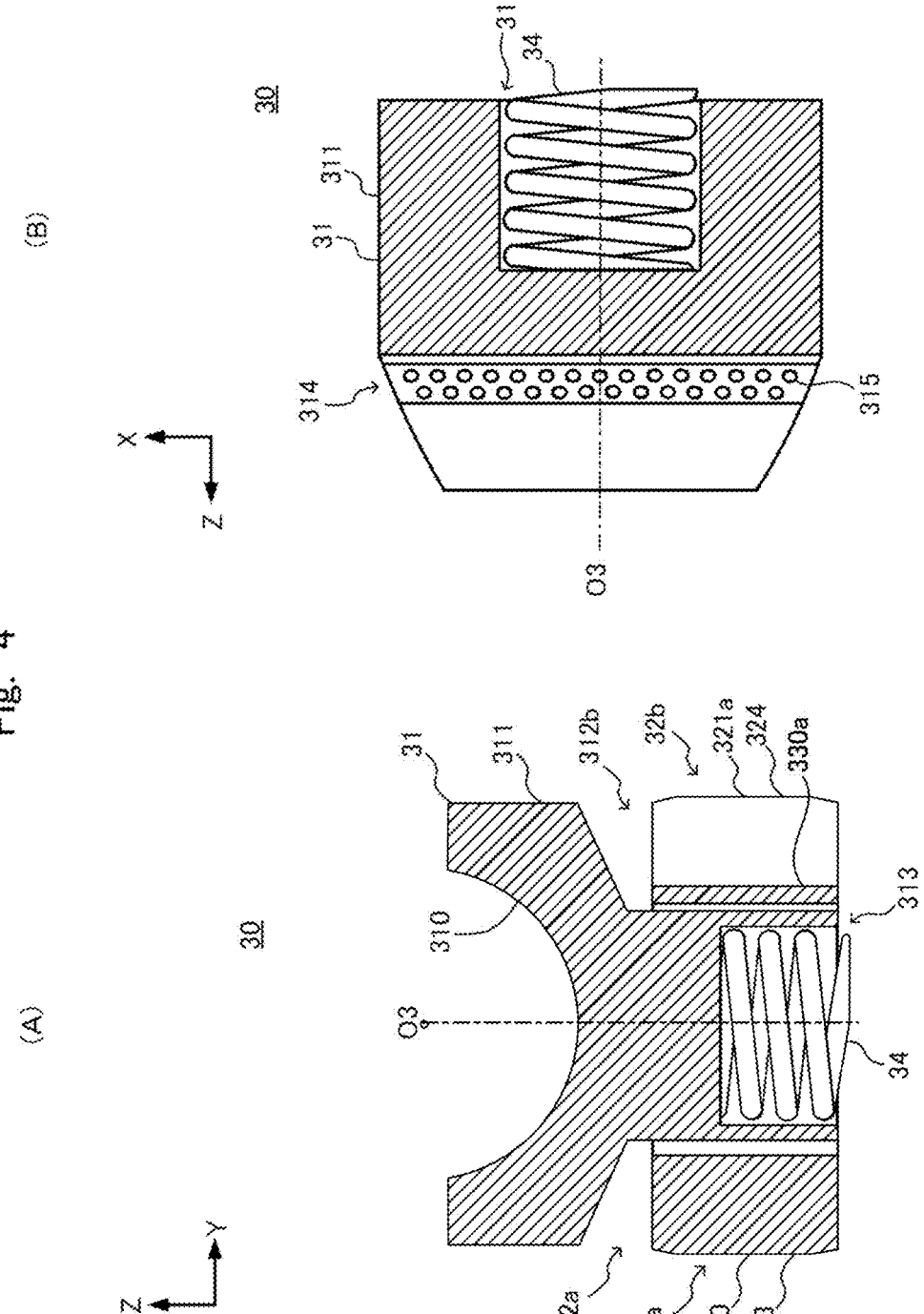
FIG. 4(A) and FIG. 4(B) are an A-A cross-sectional view and a B-B cross-sectional view, respectively, of the rack guide 30 illustrated in FIG. 3(A).
Figure 6:
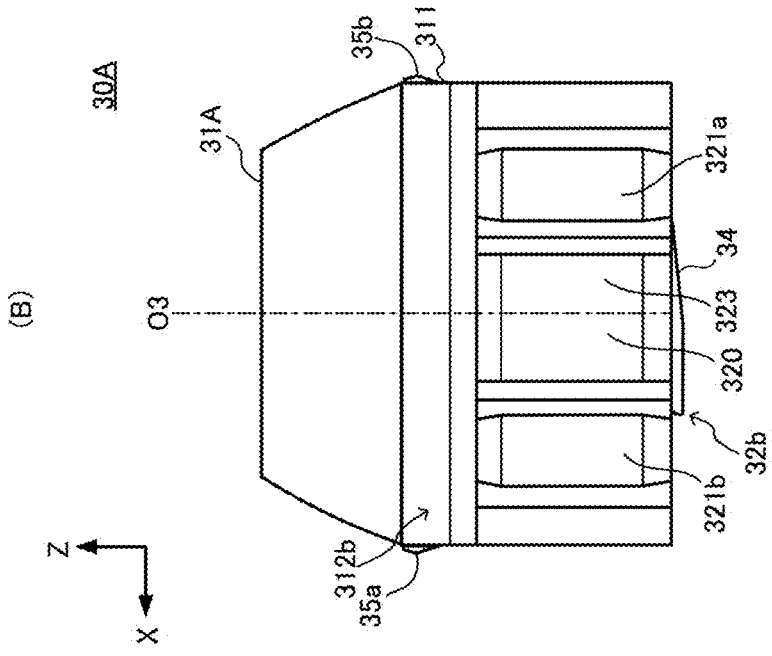
FIG. 6(A) and FIG. 6(B) are a front view and a side view, respectively, of a modification 30A of the rack guide 30.
Figure 6:
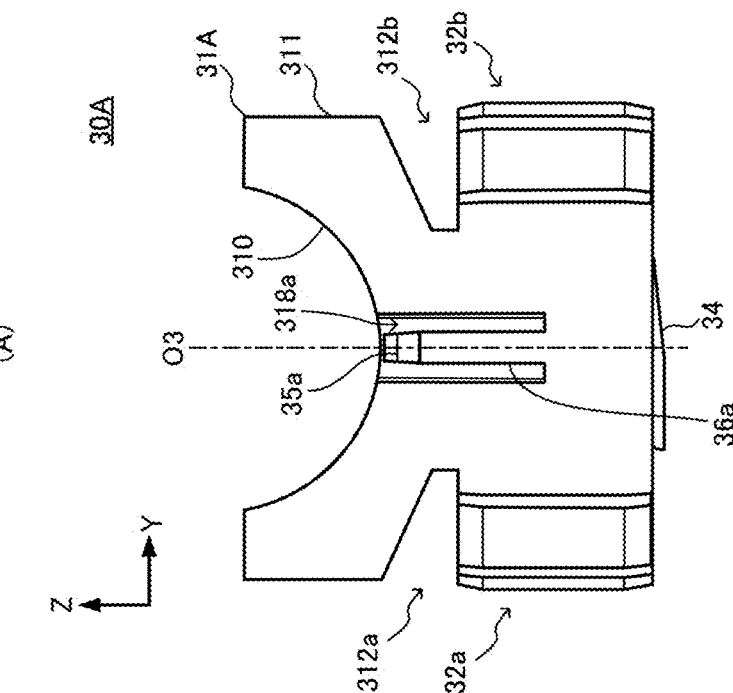
Figure 7:
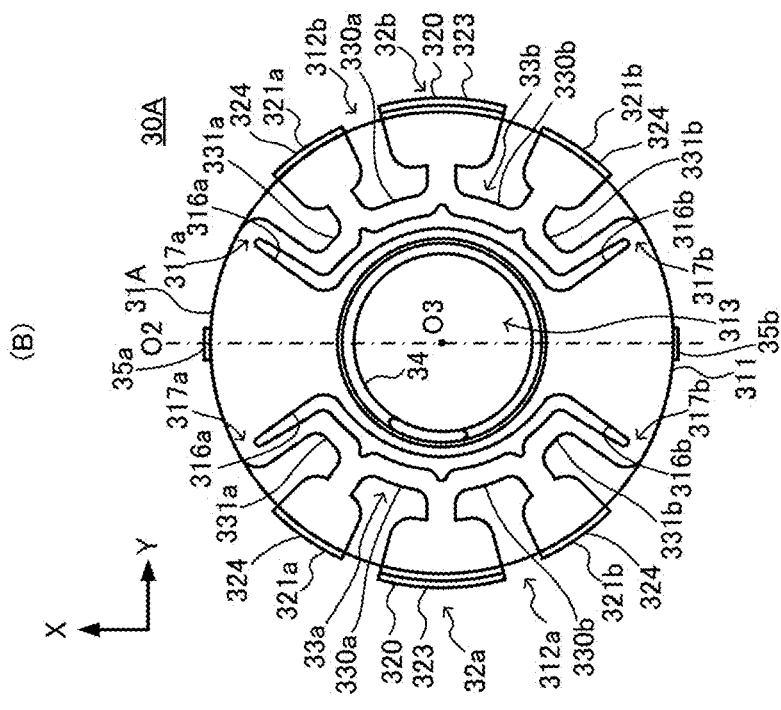
FIG. 7(A) and FIG. 7(B) are a plane view and a bottom view, respectively, of the modification 30A of the rack guide 30.
Figure 7:
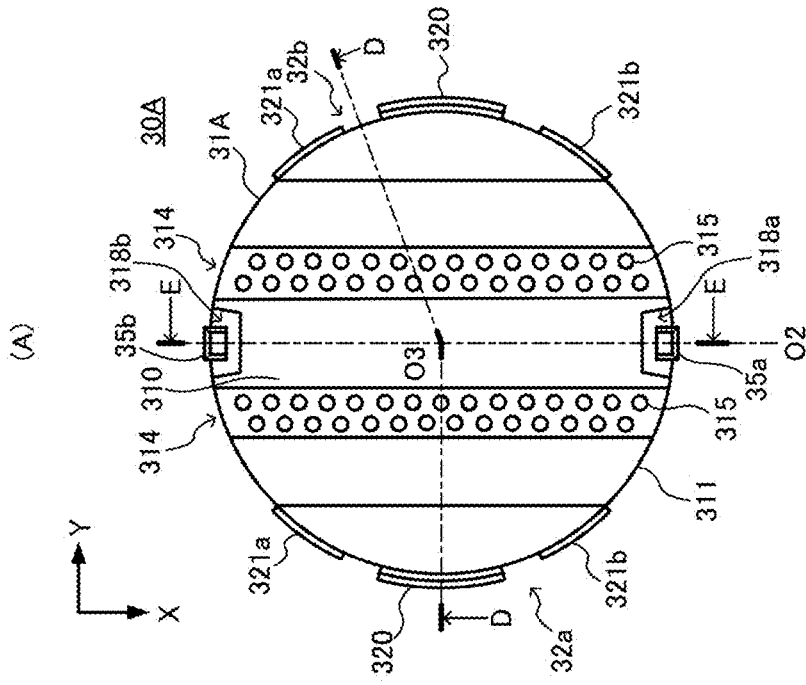
Figure 8:
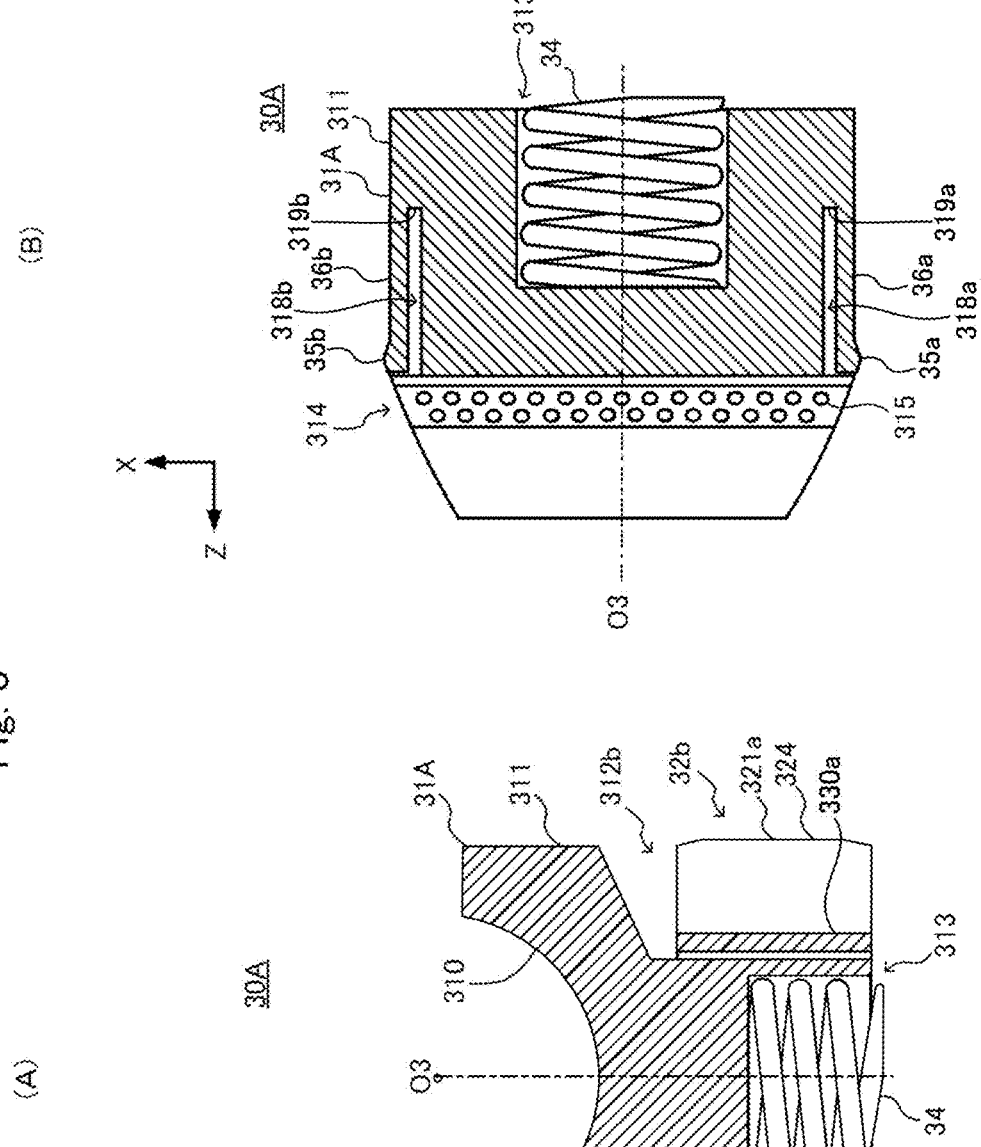
FIG. 8(A) and FIG. 8(B) are a D-D cross-sectional view and an E-E cross-sectional view, respectively, of the modification 30A of the rack guide 30 illustrated in FIG. 7(A).

A rack guide 30A as illustrated in FIG. 6 to FIG. 8 differs from the rack guide 30 as illustrated in FIG. 2 to FIG. 4 in that a rack guide body 31A is provided instead of the rack guide body 31 and in that a pair of supporting portions 35a, 35b provided to be movable in a radial direction of the rack guide body 31A and biasing portions 36a, 36b for biasing the supporting portions 35a, 35b outwardly in the radial direction of the rack guide 30A, respectively, are added. The other elements are the same as those of the rack guide 30.

The rack guide body 31A differs from the rack guide body 31 in that a pair of pockets 318a, 318b are added which are provided on an outer circumferential surface 311 of the rack guide body 31A and contain the supporting portions 35a, 35b along with the biasing portions 36a, 36b, respectively. The other elements are the same as those of the rack guide body 31.

The pockets 318a, 318b are defined on both sides (in the direction (the X direction) of sliding between the guide surface 310 and the rack bar 20) of the outer circumferential surface 311 of the rack guide body 31A as if the outer circumferential surface 311 were partially cut off. The pocket 318a contains the supporting portion 35a along with biasing portion 36a, and the pocket 318b contains the supporting portion 35b along with the biasing portion 36b.

The supporting portions 35a, 35b are located on the both side (in the direction (the X direction) of sliding between the guide surface 310 and the rack bar) of the rack guide body 31A, and placed along with the respective biasing portions 36a, 36b in the respective pockets 318a, 318b.

The biasing portion 36a is a member in the form of a flat spring extending in a direction of an axis O3 of the rack guide body 31A from the supporting portion 35a toward a bottom face 319a in the pocket 318a to connect to the rack guide body 31A, and the biasing portion 36b is a member in the form of a flat spring extending in the direction of the axis O3 of the rack guide body 31A form the supporting portion 35b toward a bottom face 319b in the pocket 318b to connect to the rack guide body 31A.

According to the rack guide 30A with the above-mentioned structure, on both sides (in the direction (the X direction) of sliding between the guide surface 310 and the rack bar 20) of the rack guide body 31A, the supporting portions 35a, 35b are pressed against and slidable on the inner wall surface 78 of the cylinder casing portion 72 of the housing 70 under an outward force in the radial direction of the rack guide body 31A from the biasing portions 36a, 36b. This allows the rack guide 30A to be more stably placed in the housing 70 without any unintended clearance in the direction (the X direction) of sliding between the guide surface 310 and the rack bar 20, thus more effectively preventing any rattling noises from occurring even when a load acts on the rack guide 30A in the direction (the X direction) of sliding between the guide surface 310 and the rack bar 20. The other advantages are the same as those of the rack guide 30 in illustrated in FIG. 2 to FIG. 4.

In the rack guide 30 according to the above embodiment, the biasing portions 33a, 33b each are a member in the form of a flat spring extending circumferentially from the both sides (in the circumferential direction of the rack guide body 31) of the corresponding supporting portion 32a, 32b to connect to the rack guide body 31; however the present invention is not limited to this aspect. Each of the biasing portions 33a, 33b may have any shape as far as it is a member in the form of a spring having potential to bias the corresponding supporting portion 32a, 32b outwardly in the radial direction of the rack guide body 31. Similarly, in the modification 30A of the rack guide 30 according to the above embodiment, the biasing portions 36a, 36b each are a member in the form of a flat springs extending in the direction of the axis O3 of the rack guide body 31A from the corresponding supporting portions 35a, 35b toward the bottom face 319a, 319b in the corresponding pocket 318a, 318b to connect to the rack guide body 31A; however the present invention is not limited to this aspect. Each of the biasing portions 36a, 36b may have any shape as for as it is a member in the form of a spring having potential to bias the corresponding supporting portion 35a, 35b outwardly in the radial direction of the rack guide body 31A.

The above embodiments give the applications to the steering device of vehicle as a non-limited example, but the present invention is available not only for the steering device of vehicle but also widely in general for any device using a rack and pinion gear system, such as focusing system for optical device, for example.

REFERENCE SIGNS LIST

1: gear system; 10: pinion shaft;
11: pinion gear; 12: outer circumferential surface of the pinion shaft 10;
13: end portion of the pinion shaft 10; 20: rack bar;
21: rack gear; 22: back of the rack bar 20;
30, 30A: rack guide; 31, 31A: rack guide body;
32a, 32b, 35a, 35b: supporting portion;
33a, 33b, 36a, 36b: biasing portion;
34: spring; 40: rolling bearing;
60: cap; 62: threaded portion of the cap 60
70: housing; 71: rack casing portion
72: cylinder casing portion; 73: pinion gear compartment
74, 75: opening; 76: open end of the cylinder casing portion 72;
77: threaded portion of the cylinder casing portion 72;
78: inner wall surface of the cylinder casing portion 72
310: guide surface; 311: outer circumferential surface of the rack guide body 31;
312a, 312b, 318a, 318b: pocket;
313: spring guide;
314: slide area in the guide surface 310; 315: depression;
316a, 316b: side wall in the pockets 312a, 312b;
319a, 319b: bottom face in the pocket 318a, 318b
320: primary protrusion; 321a, 321b: secondary protrusion
323, 324: supporting surface;
317a, 317b: edge on the radially outer side of the side wall 316a, 316b;
330a, 330b: first flat spring portion;
331a, 331b: second flat spring portion

The invention claimed is:

1. A rack guide configured to support a rack bar having a rack gear in mesh with a pinion gear from an opposite side to the rack gear while allowing the rack bar to slide, and to guide the rack bar moving in response to rotation of the pinion gear in an axial direction of the rack bar, the rack guide comprising:

a rack guide body made of synthetic resin, the rack guide body having a cylindrical shape and an end face including a guide surface configured to slide with a back of the rack bar;

a plurality of supporting portions made of synthetic resin, the supporting portions each protruding beyond an outer circumferential surface of the rack guide body to be movable in a radial direction of the rack guide body, each of the supporting portions comprising:

a primary protrusion having a supporting surface protruding beyond the outer circumferential surface of the rack guide body; and a pair of secondary protrusions, the secondary protrusions being located on both sides of the primary protrusion in the circumferential direction of the rack guide body, each of the secondary protrusions having a supporting surface protruding beyond the outer circumferential surface of the rack guide body; and a biasing portion provided for each of the supporting portions and made of synthetic resin, the biasing portion extending along a circumferential direction of the rack guide body from both sides of a corresponding one of the supporting portions in the circumferential direction and connecting to the rack guide body, the biasing portion being configured to bias the corresponding one of the supporting portions outwardly in the radial direction of the rack guide body.

2. A rack guide according to claim 1, wherein the biasing portion comprises:

a pair of first spring portions, each of the first spring portions being arranged along the circumferential direction of the rack guide body and connecting between the primary protrusion and a corresponding one of the secondary protrusions paired; and a pair of second spring portions, each of the second spring portions being arranged along the circumferential direction of the rack guide body and connecting between a corresponding one of the secondary protrusions paired and the rack guide body.

3. A rack guide configured to support a rack bar having a rack gear in mesh with a pinion gear from an opposite side to the rack gear while allowing the rack bar to slide, and to guide the rack bar moving in response to rotation of the pinion gear in an axial direction of the rack bar, the rack guide comprising:

a rack guide body made of synthetic resin, the rack guide body having a cylindrical shape and an end face including a guide surface configured to slide with a back of the rack bar;

a plurality of supporting portions made of synthetic resin, the supporting portions each protruding beyond an outer circumferential surface of the rack guide body to be movable in a radial direction of the rack guide body, the supporting portions being located on both sides of the rack guide body, in a direction perpendicular to both an axial direction of the rack guide body and a direction of sliding between the guide surface and the rack bar, each of the supporting portions comprising:

a primary protrusion having a supporting surface protruding beyond the outer circumferential surface of the rack guide body; and a pair of secondary protrusions, the secondary protrusions being located on both sides of the primary protrusion in the circumferential direction of the rack guide body, each of the secondary protrusions having a supporting surface protruding beyond the outer circumferential surface of the rack guide body; and a biasing portion provided for each of the supporting portions and made of synthetic resin, the biasing portion extending along a circumferential direction of the rack guide body from both sides of a corresponding one of the supporting portions in the circumferential direction and connecting to the rack guide body, the biasing portion being configured to bias the corresponding one of the supporting portions outwardly in the radial direction of the rack guide body.

4. A rack guide according to claim 3, wherein the biasing portion comprises:

a pair of first spring portions, each of the first spring portions being arranged along the circumferential direction of the rack guide body and connecting between the primary protrusion and a corresponding one of the secondary protrusions paired; and a pair of second spring portions, each of the second spring portions being arranged along the circumferential direction of the rack guide body and connecting between a corresponding one of the secondary protrusions paired and the rack guide body.

5. A rack guide according to claim 1, wherein the rack guide body further comprises pockets each being formed in the outer circumferential surface of the rack guide body and containing a corresponding one of the supporting portions and a corresponding one of the biasing portions.

6. A rack guide according to claim 3, wherein the rack guide body further comprises pockets each being formed in the outer circumferential surface of the rack guide body and containing a corresponding one of the supporting portions and a corresponding one of the biasing portions.

7. A rack guide according to claim 2, wherein the rack guide body further comprises pockets each being formed in the outer circumferential surface of the rack guide body and containing a corresponding one of the supporting portions and a corresponding one of the biasing portions.

8. A rack guide according to claim 4, wherein the rack guide body further comprises pockets each being formed in the outer circumferential surface of the rack guide body and containing a corresponding one of the supporting portions and a corresponding one of the biasing portions.

9. A gear system for changing a moving direction of a moving object in response to rotation of a steering wheel, the gear system comprising:

a pinion gear arranged to rotate in response to the rotation of the steering wheel;

a rack bar having a rack gear in mesh with the pinion gear, the pinion gear and the rack gear meshing each other to cause the rack bar to reciprocate in response to the rotation of the pinion gear to change a direction of a wheel of the moving object;

a rack guide as in claim 1, the rack guide supporting the rack bar and allowing the rack bar to move in the axial direction of the rack bar; and a housing containing the rack guide and allowing the rack guide to move in the axial direction of the rack bar.

10. A gear system for changing a moving direction of a moving object in response to rotation of a steering wheel, the gear system comprising:

a pinion gear arranged to rotate in response to the rotation of the steering wheel;

a rack bar having a rack gear in mesh with the pinion gear, the pinion gear and the rack gear meshing each other to cause the rack bar to reciprocate in response to the rotation of the pinion gear to change a direction of a wheel of the moving object;

a rack guide as in claim 3, the rack guide supporting the rack bar and allowing the rack bar to move in the axial direction of the rack bar; and a housing containing the rack guide and allowing the rack guide to move in the axial direction of the rack bar.

11. A gear system for changing a moving direction of a moving object in response to rotation of a steering wheel, the gear system comprising:

a pinion gear arranged to rotate in response to the rotation of the steering wheel;

a rack bar having a rack gear in mesh with the pinion gear, the pinion gear and the rack gear meshing each other to cause the rack bar to reciprocate in response to the rotation of the pinion gear to change a direction of a wheel of the moving object;

a rack guide as in claim 2, the rack guide supporting the rack bar and allowing the rack bar to move in the axial direction of the rack bar; and a housing containing the rack guide and allowing the rack guide to move in the axial direction of the rack bar.

12. A gear system for changing a moving direction of a moving object in response to rotation of a steering wheel, the gear system comprising:

a pinion gear arranged to rotate in response to the rotation of the steering wheel;

a rack bar having a rack gear in mesh with the pinion gear, the pinion gear and the rack gear meshing each other to cause the rack bar to reciprocate in response to the rotation of the pinion gear to change a direction of a wheel of the moving object;

a rack guide as in claim 4, the rack guide supporting the rack bar and allowing the rack bar to move in the axial direction of the rack bar; and a housing containing the rack guide and allowing the rack guide to move in the axial direction of the rack bar.

13. A gear system according to claim 9, wherein the rack guide body further comprises pockets each being formed in the outer circumferential surface of the rack guide body and containing a corresponding one of the supporting portions and a corresponding one of the biasing portions.

14. A gear system according to claim 10, wherein the rack guide body further comprises pockets each being formed in the outer circumferential surface of the rack guide body and containing a corresponding one of the supporting portions and a corresponding one of the biasing portions.

\*    \*    \*    \*    \*